United States Patent
Hu et al.

(10) Patent No.: US 10,340,974 B2
(45) Date of Patent: Jul. 2, 2019

(54) WIRELESS TERMINAL AND DATA RECEIVING AND TRANSMITTING METHODS THEREOF

(71) Applicant: HUIZHOU TCL MOBILE COMMUNICATION CO., LTD., Huizhou (CN)

(72) Inventors: Shenggang Hu, Huizhou (CN); Aiping Guo, Huizhou (CN); Shiqing Zhao, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 81 days.

(21) Appl. No.: 15/311,406

(22) PCT Filed: Oct. 16, 2015

(86) PCT No.: PCT/CN2015/092128
§ 371 (c)(1),
(2) Date: Nov. 15, 2016

(87) PCT Pub. No.: WO2016/179959
PCT Pub. Date: Nov. 17, 2016

(65) Prior Publication Data
US 2017/0111080 A1   Apr. 20, 2017

Related U.S. Application Data

(63) Continuation of application No. PCT/CN2015/092128, filed on Oct. 16, 2015.

(30) Foreign Application Priority Data

May 12, 2015 (CN) .......................... 2015 1 0238473

(51) Int. Cl.
*H04B 1/50* (2006.01)
*H04L 5/14* (2006.01)
(Continued)

(52) U.S. Cl.
CPC ............... *H04B 1/50* (2013.01); *H04L 5/001* (2013.01); *H04L 5/14* (2013.01); *H04W 72/0406* (2013.01)

(58) Field of Classification Search
CPC . H04B 1/50; H04L 5/001; H04L 5/14; H04W 72/0406
See application file for complete search history.

(56) References Cited

U.S. PATENT DOCUMENTS 6,047,199 A * 4/2000 DeMarco ............. H04B 1/0483
455/561
6,614,778 B1 * 9/2003 Hwang ................ H04B 7/2646
370/329

(Continued)

FOREIGN PATENT DOCUMENTS

CN         1845469 A       10/2006
CN       101009514 A        8/2007
(Continued)

*Primary Examiner* — Chirag G Shah
*Assistant Examiner* — Joshua Smith
(74) *Attorney, Agent, or Firm* — Shimokaji IP

(57) ABSTRACT

A wireless terminal and data receiving and transmitting methods thereof are described. When the wireless terminal receives data, an antenna is used for receiving receipt signals from an uplink band and a downlink band, allowing mixed signals to enter a duplexer. The duplexer separates receipt signals from the uplink band and downlink band, and passes the receipt signal from the downlink band through a downlink band receiving end and passes the receipt signal from the uplink band through a shift switch to enter a central processing unit for aggregation together.

18 Claims, 2 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 6,898,197 B1* | 5/2005 | Lavean | ................. | H04B 1/707 |
| | | | | 342/357.64 |
| 2002/0055360 A1* | 5/2002 | Chen | .................... | H04W 16/00 |
| | | | | 455/452.2 |
| 2002/0196766 A1* | 12/2002 | Hwang | ................ | H04W 52/44 |
| | | | | 370/342 |
| 2003/0193923 A1* | 10/2003 | Abdelgany | ............ | H04B 1/005 |
| | | | | 370/342 |
| 2004/0111742 A1* | 6/2004 | Hendricks | .............. | H04H 20/10 |
| | | | | 725/34 |
| 2005/0002349 A1* | 1/2005 | Hayashi | ............... | H04B 7/2643 |
| | | | | 370/320 |
| 2005/0058103 A1* | 3/2005 | Jeong | .................. | H04B 1/7105 |
| | | | | 370/335 |
| 2006/0215611 A1* | 9/2006 | Nakagawa | ......... | H04W 72/044 |
| | | | | 370/332 |
| 2007/0121531 A1* | 5/2007 | Lee | ..................... | H04B 7/2615 |
| | | | | 370/280 |
| 2008/0137566 A1* | 6/2008 | Marholev | .............. | H04B 1/406 |
| | | | | 370/310 |
| 2008/0139118 A1* | 6/2008 | Sanguinetti | ......... | H04B 1/0053 |
| | | | | 455/41.2 |
| 2008/0187076 A1* | 8/2008 | Wu | ....................... | H04B 7/082 |
| | | | | 375/323 |
| 2008/0192660 A1* | 8/2008 | Li | ...................... | H04W 72/087 |
| | | | | 370/294 |
| 2008/0232305 A1* | 9/2008 | Oren | .................... | H04B 7/022 |
| | | | | 370/328 |
| 2009/0074051 A1* | 3/2009 | Manapragada | ....... | H04L 65/607 |
| | | | | 375/240 |
| 2009/0239471 A1* | 9/2009 | Tran | ...................... | H04B 1/006 |
| | | | | 455/41.2 |
| 2010/0008338 A1* | 1/2010 | Tsfati | .................... | H04B 1/006 |
| | | | | 370/338 |
| 2010/0074257 A1* | 3/2010 | Lim | ..................... | H04B 1/7087 |
| | | | | 370/392 |
| 2010/0142464 A1* | 6/2010 | Jackson | ............... | H04B 7/2656 |
| | | | | 370/329 |
| 2010/0311353 A1* | 12/2010 | Teillet | .................... | H01Q 1/246 |
| | | | | 455/84 |
| 2011/0091025 A1* | 4/2011 | Francisco | ........... | H04L 12/2834 |
| | | | | 379/93.02 |
| 2012/0163245 A1 | 6/2012 | Tone et al. | | |
| 2012/0263161 A1* | 10/2012 | Harke | .................. | H04B 1/006 |
| | | | | 370/339 |
| 2014/0219124 A1* | 8/2014 | Chang | .................. | H04B 7/0413 |
| | | | | 370/252 |
| 2015/0327265 A1* | 11/2015 | Lee | ................... | H04W 72/0446 |
| | | | | 370/311 |

FOREIGN PATENT DOCUMENTS

| | | |
|---|---|---|
| CN | 102056346 | 5/2011 |
| CN | 103238274 A | 8/2013 |
| CN | 104883199 A | 9/2015 |
| KR | 20130048553 A | 5/2013 |

\* cited by examiner

WIRELESS TERMINAL AND DATA RECEIVING AND TRANSMITTING METHODS THEREOF

TECHNICAL FIELD

The present disclosure relates to the technical field of wireless terminals. In particular, the present disclosure relates to a wireless terminal and data receiving and transmitting methods thereof.

BACKGROUND

In conventional wireless terminals such as mobile phones, carrier aggregation is an aggregation of a plurality of continuous or discontinuous uplink or downlink spectrums and even spectrum fragment carriers together. In this manner, a wider spectrum is achieved, thus increasing the transmission speed. This carrier aggregation can refer to the aggregation of a plurality of downlink spectrums to increase downlink transmission speed or the aggregation of a plurality of uplink spectrums to increase uplink transmission speed.

In a frequency division duplex mode, the uplink band and downlink band of a wireless terminal have the same bandwidth, that is, the wireless terminal has the same uplink transmission bandwidth and downlink receiving bandwidth. However, the uplink data and downlink data requirements of the wireless terminal are usually asymmetric. In other words, the demands of downlink data for transmission speed and data volume are usually larger than that of the uplink data, resulting in a saturated downlink band but an idle uplink band as well as a low utilization rate of the wireless terminal, which results in a serious waste of uplink band resources and inconveniences users.

Therefore, there is a need for an improved data receiving and transmitting method for mobile terminals.

SUMMARY

In light of the deficiencies of the prior art, a wireless terminal and data receiving and transmitting methods thereof are described, advantageously avoiding a low utilization ratio of the uplink band and resource waste of wireless terminals.

In an embodiment, a wireless terminal is provided, comprising a central processing unit, an RF transceiver, an uplink band transmitting end, an uplink band receiving end, a downlink band receiving end, a shift switch, a duplexer and an antenna is provided. The central processing unit is connected with a control end of the shift switch. The antenna is connected with a movable contact of the shift switch through the duplexer. A first fixed contact of the shift switch is connected with the central processing unit through the uplink band transmitting end and the RF transceiver successively, and a second fixed contact of the shift switch is connected with the central processing unit through the uplink band receiving end and the RF transceiver successively. The antenna is connected with the central processing unit through the duplexer, the downlink band receiving end, and the RF transceiver successively.

In an embodiment, when the wireless terminal receives data, the central processing unit controls the control end of the shift switch, so that the movable contact is connected with the second fixed contact. The antenna receives receipt signals from an uplink band and a downlink band, and allows mixed signals to enter the duplexer. The duplexer separates the receipt signals from the uplink band and downlink band, and passes the receipt signal from the downlink band through the downlink band receiving end and RF transceiver to enter the central processing unit for processing. The duplexer passes the receipt signal from the uplink band through the movable contact, the second fixed contact, the uplink band receiving end and the RF transceiver to enter the central processing unit for processing. The central processing unit aggregates the data received by the uplink band and downlink band.

In a further embodiment, when the wireless terminal transmits data, the central processing unit controls the control end of the shift switch to connect the movable contact with the first fixed contact, and the central processing unit transmits the data to be transmitted through the antenna after the data passes through the RF transceiver, the uplink band transmitting end, the first fixed contact and the movable contact of the shift switch and the duplexer successively.

In a further embodiment, the wireless terminal comprises a SIM connected with the central processing unit.

In a further embodiment, the wireless terminal comprises a cell, a power manager, a camera and a touch screen, wherein the cell is connected with the central processing unit through the power manager, and wherein the camera and the touch screen are connected with the central processing unit respectively.

In a further embodiment, each of the uplink band transmitting end, the uplink band receiving end and the downlink band receiving end comprise a filter and a power amplifier.

In a further embodiment, the shift switch is a high-speed shift switch.

In another embodiment, a data receiving method of wireless terminal is provided, wherein the wireless terminal comprises a central processing unit, an RF transceiver, an uplink band receiving end, a downlink band receiving end, a shift switch, a duplexer and an antenna. The central processing unit is connected with a control end of the shift switch. The antenna is connected with a movable contact of the shift switch through the duplexer. A second fixed contact of the shift switch is connected with the central processing unit through the uplink band receiving end and the RF transceiver successively. The antenna is connected with the central processing unit through the duplexer, the downlink band receiving end and the RF transceiver successively.

The data receiving method may include:
  when the wireless terminal receives data, the central processing unit controls the control end of the shift switch, so that the movable contact is connected with the second fixed contact;
  the antenna receives receipt signals from an uplink band and a downlink band, and transmits the receipt signals to the duplexer;
  the duplexer separates the receipt signals from the uplink band and downlink band, and passes the receipt signal from the downlink band through the downlink band receiving end and RF transceiver to enter the central processing unit;
  the duplexer passes the receipt signal from the uplink band through the movable contact, the second fixed contact, the uplink band receiving end and the RF transceiver to enter the central processing unit; and
  the central processing unit aggregates the data received by the uplink band and downlink band.

In a further embodiment, each of the uplink band receiving end and the downlink band receiving end comprise a filter and a power amplifier.

In a further embodiment, the shift switch is a high-speed shift switch.

In another embodiment, a data transmitting method of wireless terminal is provided, wherein the wireless terminal comprises a central processing unit, an RF transceiver, an uplink band transmitting end, a shift switch, a duplexer and an antenna. The central processing unit is connected with a control end of the shift switch. The antenna is connected with a movable contact of the shift switch through the duplexer. A first fixed contact of the shift switch is connected with the central processing unit through the uplink band transmitting end and the RF transceiver successively.

The data transmitting method may include:

when the wireless terminal transmits data, the central processing unit controls the control end of the shift switch, so that the movable contact is connected with the first fixed contact; and the central processing unit transmits the data to be transmitted through the antenna after the data passes through the RF transceiver, the uplink band transmitting end, the first fixed contact and the movable contact of the shift switch and duplexer successively.

In a further embodiment, the uplink band transmitting end comprises a filter and a power amplifier.

In a further embodiment, the shift switch is a high-speed shift switch.

In a further embodiment, when the wireless terminal transmits data, the wireless terminal uses the uplink band to receive downlink data, and the uplink band mission or downlink data receiving through time division multiplexing.

In a further embodiment, the time slots of the data transmitted and received by the uplink band are distributed based on the amount of data transmitted by the wireless terminal.

In a further embodiment, when the wireless terminal transmits a larger amount of data than an amount of data that the wireless terminal receives, an uplink data transmission duration of the uplink band is prolonged, while a downlink data receiving duration is shortened accordingly.

In a further embodiment, when the wireless terminal transmits a smaller amount of data than an amount of data that the wireless terminal receives, an uplink data transmission duration of the uplink band is shortened, while a downlink data receiving duration is prolonged accordingly.

A wireless terminal and data receiving and sending method is therefore provided, advantageously avoiding a low utilization ratio of the uplink band and resource waste of wireless terminals. The wireless terminal comprises a central processing unit, an RF transceiver, an uplink band transmitting end, an uplink band receiving end, a downlink band receiving end, a shift switch, a duplexer and an antenna. The central processing unit is connected with a control end of the shift switch. The antenna is connected with a movable contact of the shift switch through the duplexer. A first fixed contact of the shift switch is connected with the central processing unit through the uplink band transmitting end and the RF transceiver successively, and a second fixed contact of the shift switch is connected with the central processing unit through the uplink band receiving end and the RF transceiver successively. The antenna is connected with the central processing unit through the duplexer, downlink band receiving end and RF transceiver successively. When the wireless terminal receives data, the central processing unit controls the control end of the shift switch, so that the movable contact is connected with the second fixed contact. The antenna receives receipt signals from an uplink band and a downlink band, and allows mixed signals to enter the duplexer. The duplexer separates the receipt signals from the uplink band and downlink band, and passes the receipt signal from the downlink band through the downlink band receiving end and RF transceiver to enter the central processing unit for processing. The duplexer passes the receipt signal from the uplink band through the movable contact, the second fixed contact, the uplink band receiving end and the RF transceiver to enter the central processing unit for processing. The central processing unit aggregates the data received by the uplink band and downlink band. Aggregation of the downlink band and a part of uplink band increases downlink transmission rate, saves band resources and facilitates speedy data transfer on mobile terminals for the convenience of users.

DETAILED DESCRIPTION

A wireless terminal and data receiving and transmitting methods thereof are provided. In order to make the purpose, technical solutions and advantages of the present invention clearer, the invention is described in detail in combination with accompanied figures and exemplary embodiments. It should be understood that the exemplary embodiments described herein for illustrative purposes only. The exemplary embodiments are not intended to limit the scope of the claimed invention in any way.

Figure 1:
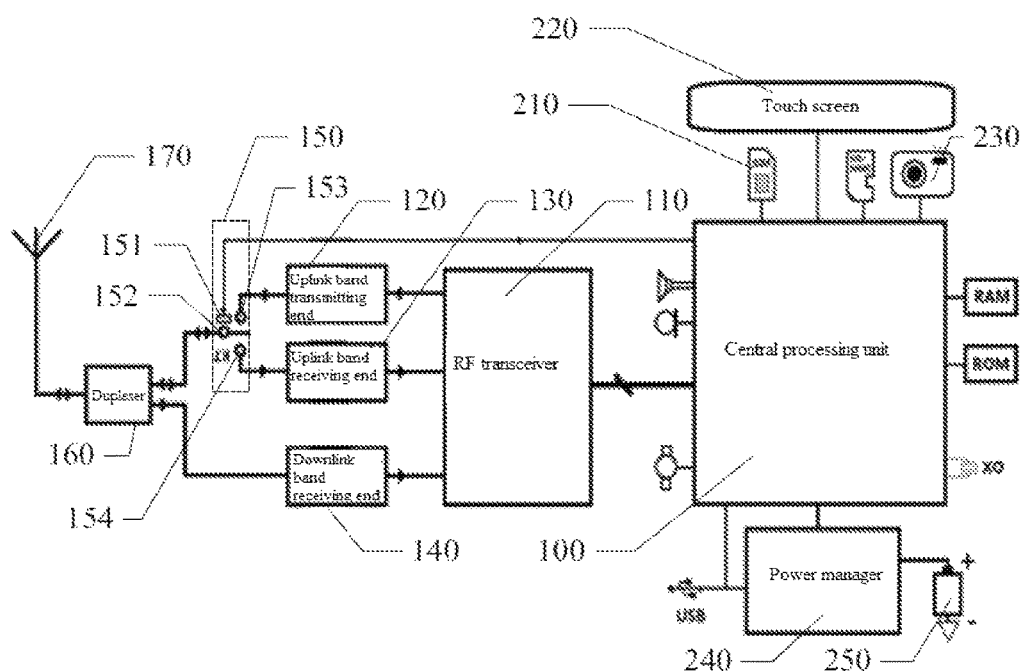
FIG. 1 depicts a structural diagram of a wireless terminal, according to an exemplary embodiment of the present invention.

Turning to FIG. 1, FIG. 1 depicts a structural diagram of a wireless terminal, according to an exemplary embodiment of the present invention. As shown in FIG. 1, the wireless terminal includes a central processing unit 100, an RF transceiver 110, an uplink band transmitting end 120, an uplink band receiving end 130, a downlink band receiving end 140, a shift switch 150, a duplexer 160 and an antenna 170. The central processing unit 110 is connected with a control end 151 of the shift switch 150. The antenna 170 is connected with a movable contact 152 of the shift switch 150 through the duplexer 160. A first fixed contact 153 of the shift switch 150 is connected with the central processing unit 100 through the uplink band transmitting end 120 and RF transceiver 110 successively, and a second fixed contact 154 thereof is connected with the central processing unit 100 through the uplink band receiving end 130 and the RF transceiver 110 successively. The antenna 170 is connected with the central processing unit 100 through the duplexer 160, downlink band receiving end 140 and RF transceiver 110 successively.

The wireless terminal may be a mobile phone, tablet computer or other wireless terminal that can transmit and receive data through an antenna. As both the RF transceiver 110 and the duplexer 160 are well known in the art, a detailed description of these elements is omitted. Each of the uplink band transmitting end 120, uplink band receiving end 130 and downlink band receiving end 140 may include a filter, a power amplifier, etc. Unlike conventional designs, a shift switch 150 is added for the uplink band channel to transmit and receive. The shift switch may be a high-speed shift switch.

When the wireless terminal in FIG. 1 receives data, the central processing unit 100 controls a control end 151 of the shift switch 150, so that the movable contact 152 is connected with the second fixed contact 154; the antenna 170 receives receipt signals from an uplink band and a downlink band, and letting mixed signals enter the duplexer 160; the duplexer 160 separates the receipt signals from the uplink band and downlink band, and passes the receipt signal from the downlink band through the downlink band receiving end 140 and RF transceiver 110 to enter the central processing unit 100 for processing (that is, passing the receipt signal from the downlink band to the central processing unit 100 through the downlink band receiving end 140 and RF transceiver 110); the duplexer 160 passes the receipt signal from the uplink band through the movable contact 152, the second fixed contact 154, the uplink band receiving end 130 and the RF transceiver 110 to enter the central processing unit 100 for processing; and the central processing unit 100 aggregates the data received by the uplink band and downlink band.

In an example, when the uplink band receives receipt data, the antenna receives signals in the uplink band. The received uplink band signal and downlink band signal enter the duplexer after being mixed, and the duplexer separates both signals. The receipt signal from the downlink band passes through the RF transceiver to enter the central processing unit (CPU) for processing, which may correspond to a conventional processor for a wireless terminal. However, unlike a conventional wireless terminal, the receipt signal from uplink band that is separated from the duplexer enters a high-speed shift switch. As this moment is a receipt moment of the uplink band, and the CPU has controlled the switch to connect to the receipt channel, the receipt signal from the uplink band passes through the high-speed shift switch to enter the RF transceiver, and then enters the CPU for processing after mixing demodulation by the RF transceiver.

The central processing unit (CPU) 100 aggregates the data received by the downlink band and uplink band, and the aggregated data will be larger than the data received just by the downlink band in unit time, which increases the downlink receiving speed. Therefore, the wireless terminal efficiently utilizes the wireless spectrum to provide large downlink bandwidth by making full use of the uplink band of the wireless terminal. By using the uplink band of wireless terminal to receive downlink data at idle time, the downlink data speed of the wireless terminal is increased, meeting user demands for greater speed and productivity.

When the wireless terminal transmits data, the central processing unit 100 controls the control end 151 of the shift switch 150 to connect the movable contact 152 with the first fixed contact 153, and the central processing unit 100 transmits the data to be transmitted through the antenna 170 after the data passes through the RF transceiver 110, the uplink band transmitting end 120, the first fixed contact 153 and the movable contact 152 of the shift switch 150 and the duplexer 160 successively.

When the wireless terminal transmits data, data output from the CPU passes through the RF transceiver and enters the high-speed shift switch that is controlled by the CPU. When the wireless terminal transmits data, the high-speed switch communicates with the uplink band transmitting end, and a transmission signal enters the duplexer after passing through the high-speed shift switch. The duplexer mixes the uplink transmission signal and downlink receiving signal into one, and transmits and receives the signal through the same antenna so as to finish the process of transmitting data through the uplink band, which may proceed in a fashion similar to a conventional wireless terminal.

In an example, the wireless terminal includes a SIM (subscriber identity module) 210 that is connected with the central processing unit 100. The SIM 210 is a conventional component of a mobile phone.

In an example, the wireless terminal includes a touch screen 220, a camera 230, a power manager 240 and a cell 250. The cell 250 is connected with the central processing unit 100 through the power manager 240, and the camera 230 and the touch screen 220 are connected with the central processing unit 100 respectively. Camera 230 and touch screen 220 are conventional elements that are known in the art. The wireless terminal may further include a storage, a secure digital (SD) memory card, an USB (universal serial bus) interface and other parts.

The provided wireless terminal can receive downlink data through the uplink band, and the uplink band realizes uplink data transmitting or downlink data receiving through time division multiplexing. When the uplink band receives data, the uplink band receipt spectrum and downlink band receipt spectrum thereof are aggregated so as to significantly increase data receiving speed. When the uplink band realizes downlink spectrum reception during time division multiplexing, and the downlink band realizes downlink data reception, the downlink spectrum of the downlink band and the downlink spectrum of the uplink band are aggregated. The width of the aggregated spectrum is significantly increased, and the added part is the downlink spectrum of the uplink band. When the uplink band realizes uplink data transmitting through time division multiplexing, the downlink receiving spectrum of the downlink band is the same as the traditional wireless terminal, and the downlink receiving width thereof is also the same as a conventional wireless terminal. Therefore, the wireless terminal can aggregate downlink receiving spectrums so as to increase the bandwidth of the receiving spectrum and increase receiving speed only when the uplink band realizes downlink data receiving through time division multiplexing. As a result, the uplink band is used for downlink receipt when at idle time, which can increase the downlink receiving speed.

Further, the time slots of the time division multiplexing for data transmitted and received by the uplink band of wireless terminal may be distributed based on an amount of data transmitted by the wireless terminal. When the wireless terminal transmits a large amount of data compared to received data, the uplink data transmission duration of the uplink band is prolonged, while the downlink data receiving duration is shortened accordingly. On the contrary, when the wireless terminal transmits a small amount of data compared to received data, the uplink data transmission duration of the uplink band is shortened, while the downlink data receiving duration is prolonged accordingly.

The wireless terminal of the invention aggregates the downlink spectrum and a part of uplink spectrum of the band together, and makes use of the uplink spectrum to make the uplink spectrum and downlink spectrum identical in frequency utilization ratio and maximize a utilization ratio of the both uplink spectrum and downlink spectrum, which increases the downlink transmission speed. The wireless terminal lets the uplink band realize uplink data transmitting and downlink data receiving through time division multiplexing and aggregates through the downlink spectrum in uplink band and downlink spectrum in downlink band that are subject to time division multiplexing so as to increase the downlink speed. Furthermore, the high-speed switch switches the transmitting and receiving of the uplink band channel. Further, the transmitting and receiving time slots of the uplink band channel of wireless terminal are distributed based on an amount of data transmitted by the wireless terminal, which optimizes performance for the user.

Figure 2:
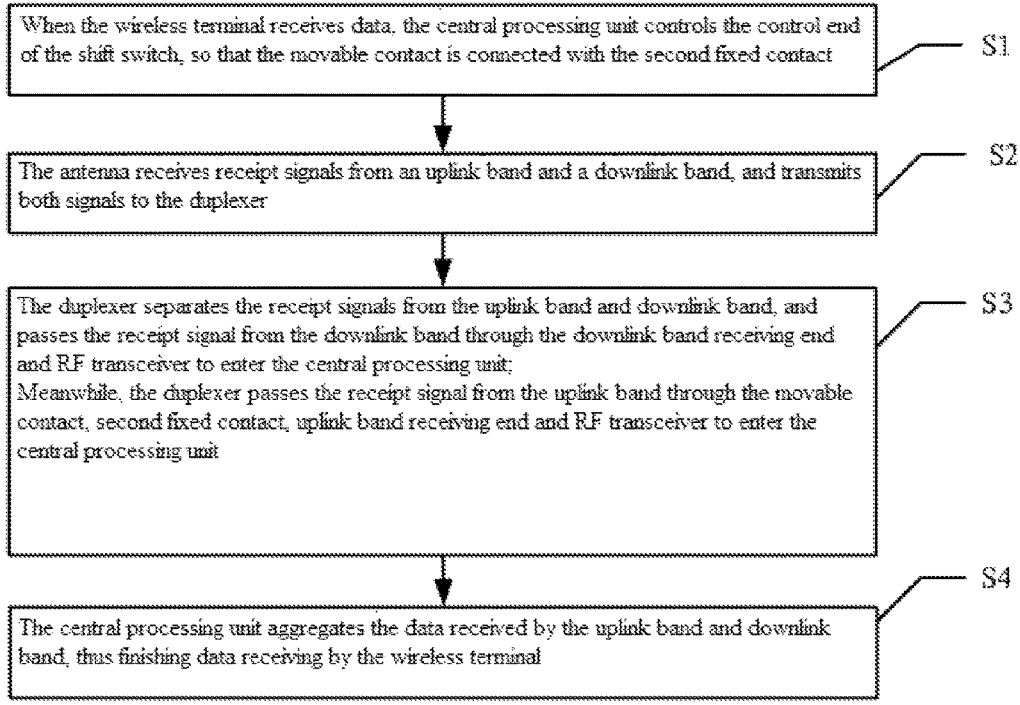
FIG. 2 depicts a flowchart of a data receiving method of a wireless terminal, according to an exemplary embodiment of the present invention.

A data receiving method using a wireless terminal is provided (see FIG. 2), which may include:
- when the wireless terminal receives data, the central processing unit controls the control end of the shift switch, so that the movable contact is connected with the second fixed contact; (block S1)
- the antenna receives receipt signals from an uplink band and a downlink band, and transmits the receipt signals to the duplexer in a muxed manner; (block S2)
- the duplexer separates the receipt signals from the uplink band and downlink band, and passes the receipt signal from the downlink band through the downlink band receiving end and RF transceiver to enter the central processing unit; the duplexer passes the receipt signal from the uplink band through the movable contact, the second fixed contact, the uplink band receiving end and the RF transceiver to enter the central processing unit; (block S3) and
- the central processing unit aggregates the data received by the uplink band and downlink band. (block S4)

Figure 3:
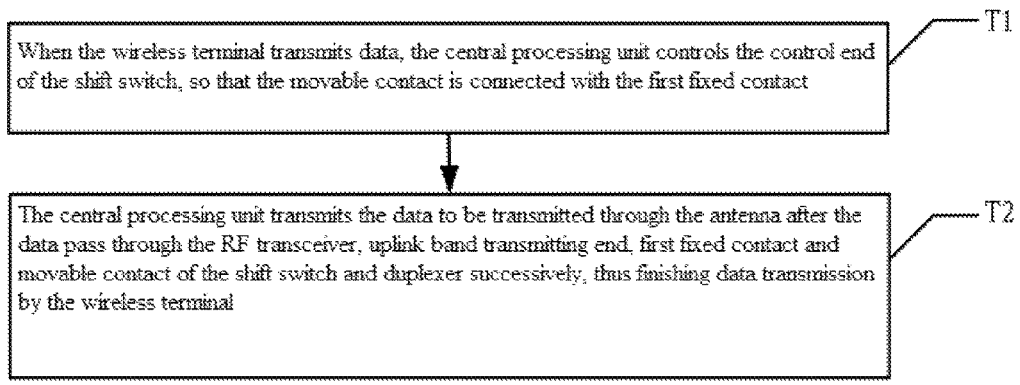
FIG. 3 depicts a flowchart of a data transmitting method of a wireless terminal, according to an exemplary embodiment of the present invention.

A data transmitting method using a wireless terminal is provided (see FIG. 3), which may include:
- when the wireless terminal transmits data, the central processing unit controls the control end of the shift switch, so that the movable contact is connected with the first fixed contact; (block T1)
- the central processing unit transmits the data to be transmitted through the antenna after the data passes through the RF transceiver, the uplink band transmitting end, the first fixed contact and the movable contact of the shift switch and duplexer successively. (block T2)

Thus, a wireless terminal and data receiving and transmitting methods thereof have been provided. When the wireless terminal receives data, the central processing unit controls the control end of the shift switch, so that the movable contact is connected with the second fixed contact. The antenna receives receipt signals from an uplink band and a downlink band, and allows mixed signals to enter the duplexer. The duplexer separates receipt signals from the uplink band and downlink band, and passes the receipt signal from the downlink band through the downlink band receiving end and RF transceiver to enter the central processing unit for processing. The duplexer passes the receipt signal from the uplink band through the movable contact, the second fixed contact, the uplink band receiving end and the RF transceiver to enter the central processing unit for processing. The central processing unit aggregates the data received by the uplink band and downlink band. Aggregation of the downlink spectrum and a part of uplink spectrum in the band increases the downlink transmission rate, saves spectrum resources and facilitates speedy data transfer on mobile terminals for the convenience of users.

It should be understood that the application of the present invention is not limited to the examples above. Those skilled in the art can improve or change the invention based on the descriptions above, and the improvement and changes shall fall within the protection scope of the appended claims.

What is claimed is:

1. A wireless terminal, comprising:
   a central processing unit;
   an RF transceiver;
   an uplink band transmitting end;
   an uplink band receiving end;
   a downlink band receiving end;
   a shift switch;
   a duplexer; and
   an antenna,
   wherein:
   the central processing unit is connected with a control end of the shift switch,
   the antenna is connected with a movable contact of the shift switch through the duplexer,
   a first fixed contact of the shift switch is connected with the central processing unit through the uplink band transmitting end and the RF transceiver successively,
   a second fixed contact of the shift switch is connected with the central processing unit through the uplink band receiving end and the RF transceiver successively,
   the antenna is connected with the central processing unit through the duplexer, the downlink band receiving end and the RF transceiver successively; and
   wherein the wireless terminal is configured to receive data via a downlink band and via an uplink band, wherein an uplink receipt spectrum of the uplink band and a downlink band receipt spectrum of the downlink band are aggregated, and wherein a downlink data receiving duration of the uplink band is distributed based on an amount of data transmitted by the wireless terminal using time division multiplexing, such that when the wireless terminal receives data:
   the antenna receives a receipt signal comprising a first receipt signal from the uplink band and a second receipt signal from the downlink band,
   the duplexer receives, from the antenna, the receipt signal including the first receipt signal from the uplink band and the second receipt signal from the downlink band, separates the receipt signal into a separated first receipt signal and a separated second receipt signal, and passes the separated second receipt signal through the downlink band receiving end and the RF transceiver to enter the central processing unit for processing,
   the central processing unit controls the control end of the shift switch to connect the movable contact with the second fixed contact so that the duplexer passes the separated first receipt signal through the movable contact, the second fixed contact, the uplink band receiving end and the RF transceiver to enter the central processing unit for processing, and
   the central processing unit aggregates data received in the separated first receipt signal and the separated second receipt signal.

2. The wireless terminal according to claim 1, wherein the wireless terminal is further configured such that when the wireless terminal transmits data:
   the central processing unit controls the control end of the shift switch to connect the movable contact with the first fixed contact, and the central processing unit transmits the data to be transmitted through the antenna after the data passes through the RF transceiver, the uplink band transmitting end, the first fixed contact and the movable contact of the shift switch and the duplexer successively.

3. The wireless terminal according to claim 1, wherein the wireless terminal comprises a SIM connected with the central processing unit.

4. The wireless terminal according to claim 1, wherein the wireless terminal further comprises a cell, a power manager, a camera and a touch screen, wherein the cell is connected with the central processing unit through the power manager, and wherein the camera and the touch screen are connected with the central processing unit respectively.

5. The wireless terminal according to claim 1, wherein each of the uplink band transmitting end, the uplink band receiving end and the downlink band receiving end comprises a filter and a power amplifier.

6. The wireless terminal according to claim 1, wherein the shift switch is a high-speed shift switch.

7. A data receiving method of a wireless terminal, wherein the wireless terminal comprises:
- a central processing unit;
- an RF transceiver;
- an uplink band receiving end;
- a downlink band receiving end;
- a shift switch;
- a duplexer and an antenna,
- wherein:
  - the central processing unit is connected with a control end of the shift switch,
  - the antenna is connected with a movable contact of the shift switch through the duplexer,
  - a first fixed contact of the shift switch is connected with the central processing unit through an uplink band transmitting end and the RF transceiver successively,
  - a second fixed contact of the shift switch is connected with the central processing unit through the uplink band receiving end and the RF transceiver successively,
  - the antenna is connected with the central processing unit through the duplexer, the downlink band receiving end and the RF transceiver successively; and
- wherein the data receiving method comprises:
  - the antenna receives a receipt signal including a first receipt signal from an uplink band and a second receipt signal from a downlink band, and transmits the receipt signal to the duplexer, wherein an uplink receipt spectrum of the uplink band and a downlink band receipt spectrum of the downlink band are aggregated, and wherein a downlink data receiving duration of the uplink band is distributed based on an amount of data transmitted by the wireless terminal using time division multiplexing,
  - the duplexer separates the receipt signal received from the antenna into a separated first receipt signal and a separated second receipt signal, and passes the separated second receipt signal through the downlink band receiving end and the RF transceiver to enter the central processing unit,
- the moveable contact of the shift switch connects with the second fixed contact so that the duplexer passes the separated first receipt signal through the movable contact, the second fixed contact, the uplink band receiving end and the RF transceiver to enter the central processing unit;
- increasing the downlink data receiving duration of the first receipt signal from the uplink band based on an amount of data transmitted via the wireless terminal being smaller than an amount of data received via the wireless terminal, and
- the central processing unit aggregates data received in the separated first receipt signal and the separated second receipt signal.

8. The method according to claim 7, wherein each of the uplink band receiving end and the downlink band receiving end comprises a filter and a power amplifier.

9. The method according to claim 7, wherein the shift switch is a high-speed shift switch.

10. The method according to claim 7, wherein the wireless terminal comprises a SIM connected with the central processing unit.

11. The method according to claim 7, wherein the wireless terminal further comprises a cell, a power manager, a camera and a touch screen, wherein the cell is connected with the central processing unit through the power manager, and wherein the camera and the touch screen are connected with the central processing unit respectively.

12. A data transmitting and receiving method of a wireless terminal, wherein the wireless terminal comprises:
- a central processing unit;
- an RF transceiver;
- an uplink band transmitting end;
- an uplink band receiving end;
- a downlink band receiving end;
- a shift switch;
- a duplexer; and
- an antenna,
- wherein:
  - the central processing unit is connected with a control end of the shift switch;
  - the antenna is connected with a movable contact of the shift switch through the duplexer;
  - a first fixed contact of the shift switch is connected with the central processing unit through the uplink band transmitting end and the RF transceiver successively;
  - a second fixed contact of the shift switch is connected with the central processing unit through the uplink band receiving end and the RF transceiver successively;
  - the antenna is connected with the central processing unit through the duplexer, the downlink band receiving end and the RF transceiver successively; and
- wherein, when the wireless terminal transmits uplink data, the method comprises:
  - the central processing unit controls the control end of the shift switch to connect the movable contact with the first fixed contact so that the shift switch transmits the uplink data to the duplexer;
  - combining, via the duplexer, the uplink data with downlink data that is received by the duplexer from the antenna; and
  - transmitting, via the antenna, the uplink data while receiving downlink data by the antenna,
  - wherein, when the wireless terminal transmits a larger amount of data than an amount of data that the wireless terminal receives, an uplink data transmission duration of the uplink band increases, while a downlink data receiving duration of the uplink band decreases accordingly, and when the wireless terminal transmits a smaller amount of data than an amount of data that the wireless terminal receives, an uplink data transmission duration of the uplink band decreases, while a downlink data receiving duration of the uplink band increases accordingly,
- wherein, when the wireless terminal receives data, the method comprises:
  - the central processing unit controls the control end of the shift switch to connect the movable contact with the second fixed contact,
  - the antenna receives a receipt signal comprising a first receipt signal from the uplink band and a second receipt signal from the downlink band, and transmits the receipt signal to the duplexer, the duplexer separates the receipt signal received from the antenna into a separated first receipt signal and a separated second receipt signal, and passes the separated second receipt signal through the downlink band receiving end and the RF transceiver to enter the central processing unit, the duplexer passes the separated first receipt signal through the movable contact, the second fixed contact, the uplink band receiving end and the RF transceiver to enter the central processing unit, and the central processing unit aggregates data received in the separated first receipt signal and the separated second receipt signal, wherein the wireless terminal is configured to aggregate a downlink spectrum of the downlink band and a part of an uplink spectrum of the uplink band, utilize the uplink spectrum and the downlink spectrum in a utilization ratio, and maximize the utilization ratio of the uplink spectrum and downlink spectrum.

13. The method according to claim 12, wherein each of the uplink band transmitting end, the uplink band receiving end and the downlink band receiving end comprises a filter and a power amplifier.

14. The method according to claim 12, wherein the shift switch is a high-speed shift switch.

15. The method according to claim 12, wherein when the wireless terminal transmits data, the wireless terminal uses the uplink band to receive the downlink data, and the uplink band realizes uplink data transmitting or downlink data receiving through time division multiplexing.

16. The method according to claim 15, wherein time slots of the time division multiplexing for data transmitted and received by the uplink band are distributed based on an amount of data transmitted by the wireless terminal.

17. The method according to claim 12, wherein the wireless terminal comprises a SIM connected with the central processing unit.

18. The method according to claim 12, wherein the wireless terminal further comprises a cell, a power manager, a camera and a touch screen, wherein the cell is connected with the central processing unit through the power manager, and wherein the camera and the touch screen are connected with the central processing unit respectively.

* * * * *